(12) United States Patent  (10) Patent No.: US 6,796,212 B2
Maekawa et al.  (45) Date of Patent: Sep. 28, 2004

(54) SCRIBING METHOD FOR BRITTLE MATERIALS, A CUTTER WHEEL USED THEREFOR AND AN APPARATUS PROVIDED THEREWITH

(75) Inventors: Kazuya Maekawa, Suita (JP); Haruo Wakayama, Suita (JP)

(73) Assignee: Mitsuboshi Diamond Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/924,465

(22) Filed: Aug. 9, 2001

(65) Prior Publication Data

US 2002/0038594 A1 Apr. 4, 2002

(30) Foreign Application Priority Data

Aug. 11, 2000 (JP) ........................................ 2000-244310

(51) Int. Cl.[7] ................................................ B26D 3/08
(52) U.S. Cl. ........................ 83/886; 83/676; 30/164.95; 30/357
(58) Field of Search .................... 83/676, 678, 332, 83/886; 225/1–5, 96, 95, 103, 884, 886, 887; 76/115; 30/319, 335, 355, 357, 164.95

(56) References Cited

U.S. PATENT DOCUMENTS

| 648,791 A | * | 5/1900 | Raynal | 83/115 |
|---|---|---|---|---|
| 1,796,463 A | * | 3/1931 | Voigt et al. | 30/240 |
| 3,593,899 A | * | 7/1971 | DeTorre | 225/2 |
| 3,865,673 A | * | 2/1975 | DeTorre | 428/43 |
| 4,382,397 A | * | 5/1983 | De Torre | 83/508 |
| 4,637,286 A | * | 1/1987 | Boggs | 83/175 |
| 4,660,453 A | * | 4/1987 | Fischer et al. | 83/663 |
| 5,022,299 A | * | 6/1991 | Fischer et al. | 83/676 |
| 5,097,727 A | * | 3/1992 | Fischer et al. | 76/115 |
| 5,331,877 A | * | 7/1994 | Ishii | 83/886 |
| 5,582,571 A | * | 12/1996 | Simpson et al. | 493/355 |
| 5,836,229 A | * | 11/1998 | Wakayama et al. | 83/886 |
| 5,890,409 A | * | 4/1999 | Carlton et al. | 83/678 |
| 5,979,285 A | * | 11/1999 | Rasmussen et al. | 83/676 |
| 6,065,215 A | * | 5/2000 | Arai | 30/319 |

FOREIGN PATENT DOCUMENTS

| DE | 3140087 A1 | * | 4/1983 | C03B/33/02 |
|---|---|---|---|---|
| IT | 0402694 A2 | * | 5/1990 | B29C/51/44 |
| JP | 06056451 A | * | 3/1994 | C03B/33/027 |

* cited by examiner

*Primary Examiner*—Allan N. Shoap
*Assistant Examiner*—Ghassem Alie
(74) *Attorney, Agent, or Firm*—Wenderoth, Lind & Ponack L.L.P.

(57) ABSTRACT

A cutter wheel for brittle materials includes a disk with two side planes and an outer peripheral portion between the planes. The outer peripheral portion includes two bevel portions and a ridge portion between the bevel portions. The ridge portion has a plurality of peaks aligned along a circumferential line. For example, the ridge portion includes a straight line connecting two adjacent peaks in the plurality of peaks. Alternatively, the ridge portion is a depression between two adjacent peaks in the plurality of peaks, and the depth of the depression is deeper than the straight line connecting the two adjacent peaks. Preferably, the peaks are spaced apart at an equal distance.

22 Claims, 8 Drawing Sheets

SCRIBING METHOD FOR BRITTLE MATERIALS, A CUTTER WHEEL USED THEREFOR AND AN APPARATUS PROVIDED THEREWITH

BACKGROUND OF THE INVENTION

1. Field of the Invention

The present invention relates to a scribing method for forming scribe lines on a brittle plate such as a glass plate, a semiconductor wafer, or a ceramic plate, to a cutter wheel used for such a method by rotating the wheel on a brittle sheet; and to an apparatus provided with such a cutter wheel.

2. Description of the Prior Art

A cutter wheel for brittle materials is fabricated by working a disk made of a cemented carbide alloy, sintered diamond or the like. The disk is ground at the outer periphery obliquely on the two sides to form an edge having a V-shape. A rotational shaft is fixed to a shaft hole provided at the center of the disk, and the shaft is rotatably mounted in a manual cutter or in a cutter head of an automatic scriber or the like. Accordingly, the cutter wheel is rotated on a brittle plate such as a glass sheet, a semiconductor wafer or a ceramic plate under a pressure to form scribe lines on the brittle plate.

However, such a conventional cutter wheel cannot generate deep vertical cracks inside a brittle sheet. Further, the wheel is liable to slip on a brittle sheet during scribing, and this abrades the edge. In addition, residual stress remains along scribe lines. Further, when the brittle sheet is cut along the scribe lines, unnecessary defects due to horizontal cracks are liable to be generated at the sections subjected to the cutting. This is a problem concerning the quality of brittle cutting.

Deep vertical cracks can be obtained by the cutter wheel disclosed in the U.S. Pat. No. 5,836,229. As shown in FIG. 1, the cutter wheel 1 has a disk with V-shaped bevel portions 2, and an edge 3 between the bevel portions 2 has depressions 4 of microscopic sizes spaced apart at equal distances to provide protrusions 5 between them which contact a brittle sheet. It is possible by use of the cutter wheel 1 to generate deep vertical cracks into a brittle sheet. Further, the residual stress is decreased, and the generation of unnecessary defects due to horizontal cracks along the scribe lines is not increased.

One of the main uses of the cutter wheel for brittle materials is cutting of glass sheets used for flat panel displays (FPD's for abbreviation) such as liquid crystal display (LCD for abbreviation) panels. Recently, there is a high demand for LCD panels of high quality. Therefore, it is necessary to suppress the generation of unnecessary horizontal cracks as much as possible.

SUMMARY OF THE INVENTION

An object of the present invention is to provide a scribing method for brittle materials which generates deep vertical cracks while also suppressing generation of horizontal cracks.

Another object of the present invention is to provide a cutter wheel for brittle materials which generates deep vertical cracks while suppressing generation of unnecessary horizontal cracks.

A further object of the present invention is to provide a scribing apparatus which suppresses generation of horizontal cracks by using the cutter wheel as a scribing means.

A cutter wheel for brittle materials in accordance with the present invention comprises a disk with two side planes and an outer peripheral portion between the planes. The outer peripheral portion has two bevel portions, and there is a ridge portion having a polygon shape between the bevel portions. The ridge portion comprises a plurality of peaks aligned along a circumferential line. For each pair of two adjacent peaks in the plurality of peaks, the ridge portion except the peaks extends along (or lower than) a straight line connecting the two adjacent peaks. Preferably, the peaks are arranged an equal distance apart. For example, for each pair of two adjacent peaks, the ridge portion has a polygon shape with vertices along the straight line connecting the two adjacent peaks. Thus, the edge portion has a polygon shape. Alternatively, for each pair of two adjacent peaks, the ridge portion has a depression between the two adjacent peaks, and the depression extends lower than the straight line connecting the two adjacent peaks.

An advantage of the present invention is that generation of horizontal cracks is remarkably suppressed while generating deep vertical cracks.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 2:
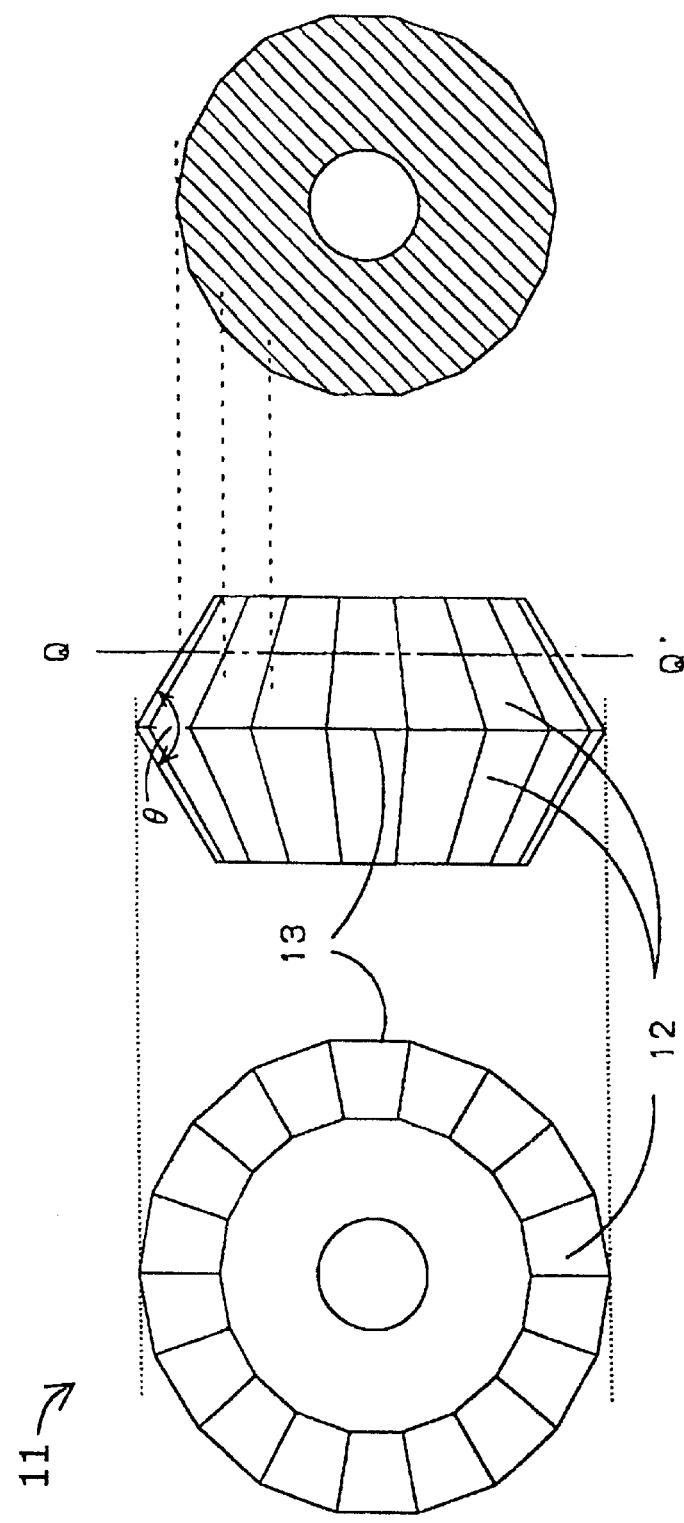
FIG. 2 is a diagram of a cutter wheel of a first embodiment of the invention.

Referring now to the drawings, wherein similar reference numerals and characters designate similar or corresponding parts throughout the several views, FIG. 2 shows a cutter wheel 11 of a first embodiment of the invention. FIG. 2 includes a side view on the left side, a front view in the center and a cross sectional view on the right side. The cutter wheel 11 has a disk with two side planes made of a cemented carbide alloy, and has an outer periphery. The outer periphery has two bevel portions 12 and a V-shaped ridge 13 between the bevel portions. The ridge 13 has a peak for contacting a brittle sheet to form scribe lines. The ridge 13 has a shape of a regular polygon with sixty subsections (sides) 10 and sixty vertices 16 when observed from a side of the wheel. As illustrated in FIG. 2 and well known in the art, the geometric term "vertex" or "vertices" refers to the point(s) of the ridge 13 located farthest from a base point. Herein, the "base point" refers to the axis of rotation of the cutter wheel 11, so that the vertices 16 (located between adjacent subsections 10 of the ridge 13) are located a maximum distance from the axis of rotation of the cutter wheel 11, as illustrated in the figures. For simplicity in FIG. 2, the ridge 13 has a shape of a regular polygon of eighteen vertices. The two bevel portions 12 extend from a side of the ridge 13 at an angle θ of 125° in a cross-section perpendicular to the disk. Any section in the bevel portions 12, including the ridge 13, has a regular polygon shape with sixty vertices. FIG. 2 shows on the right side a cross sectional view of a polygon corresponding to a cross section obtained after cutting the cutter wheel along line Q–Q' shown in the front view situated in the center of FIG. 2. The cutter wheel 11 has a central hole for inserting a rotational shaft (not shown).

Figure 3:
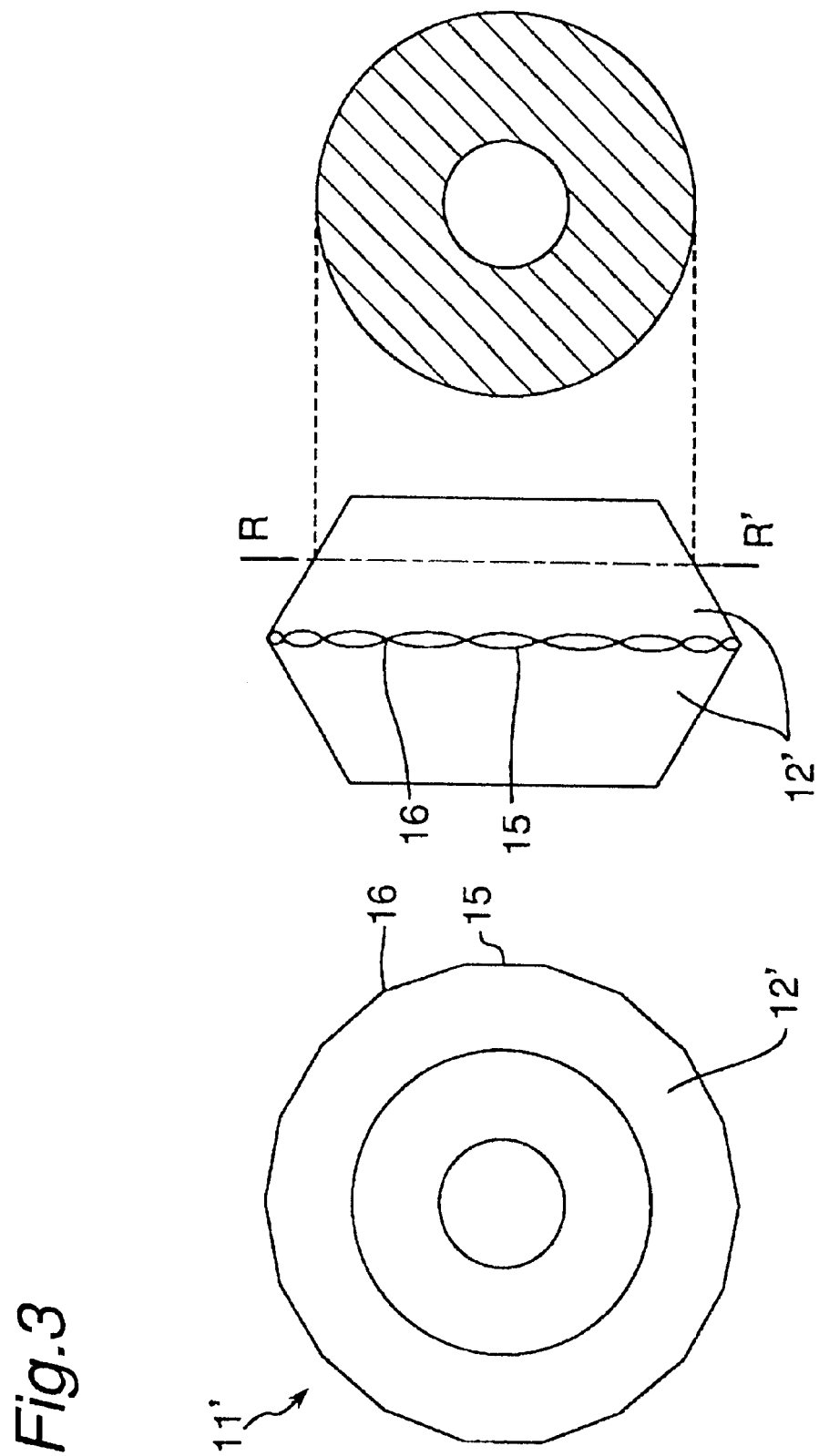
FIG. 3 is a diagram of a cutter wheel of a second embodiment of the invention.

As will be explained below, the bevel portions 12 are formed by grinding, and this results in the above-mentioned ridge 13 having the form of a regular polygon with sixty vertices, FIG. 3 shows a cutter wheel 11' of a second embodiment in accordance with the present invention. FIG. 3 includes a side view of the cutter wheel 11' on the left side, a front view of the same in the centers and a cross sectional view thereof on the right side. The cross section with the circular periphery corresponds to the cross section obtained after cutting the cutter wheel 11' along line R–R' shown in the front view. The cutter wheel 11' has a center hole for inserting a rotational shaft (not shown), and has frustoconical-shaped bevel portions 12'. The cutter wheel 11' is obtained by forming only the circular ridge of a normal cutter wheel into a polygon shape at the ridge with many flat planar portions 15 and vertices 16 between adjacent planes 15 along the ridge. The cutter wheel 11' has sixty (for simplicity, eighteen in FIG. 3) flat planes 15 and vertices 16 between adjacent planes along the ridge.

The dimensions of the cutter wheel 11 (and 11') are as follows.

| | |
|---|---|
| Wheel diameter: | 2.5 mm. |
| Wheel thickness: | 0.65 mm. |
| Edge angle (θ): | 125° |
| Number of vertices of polygon: | 60. |

By using the cutter wheel 11 (and 11'), scribing is performed according to the following scribing conditions.

| | |
|---|---|
| Edge load: | 2.0 Kgf. |
| Scribing speed: | 300 mm/sec. |
| Thickness of glass plate: | 0.7 mm. |

Figure 1:
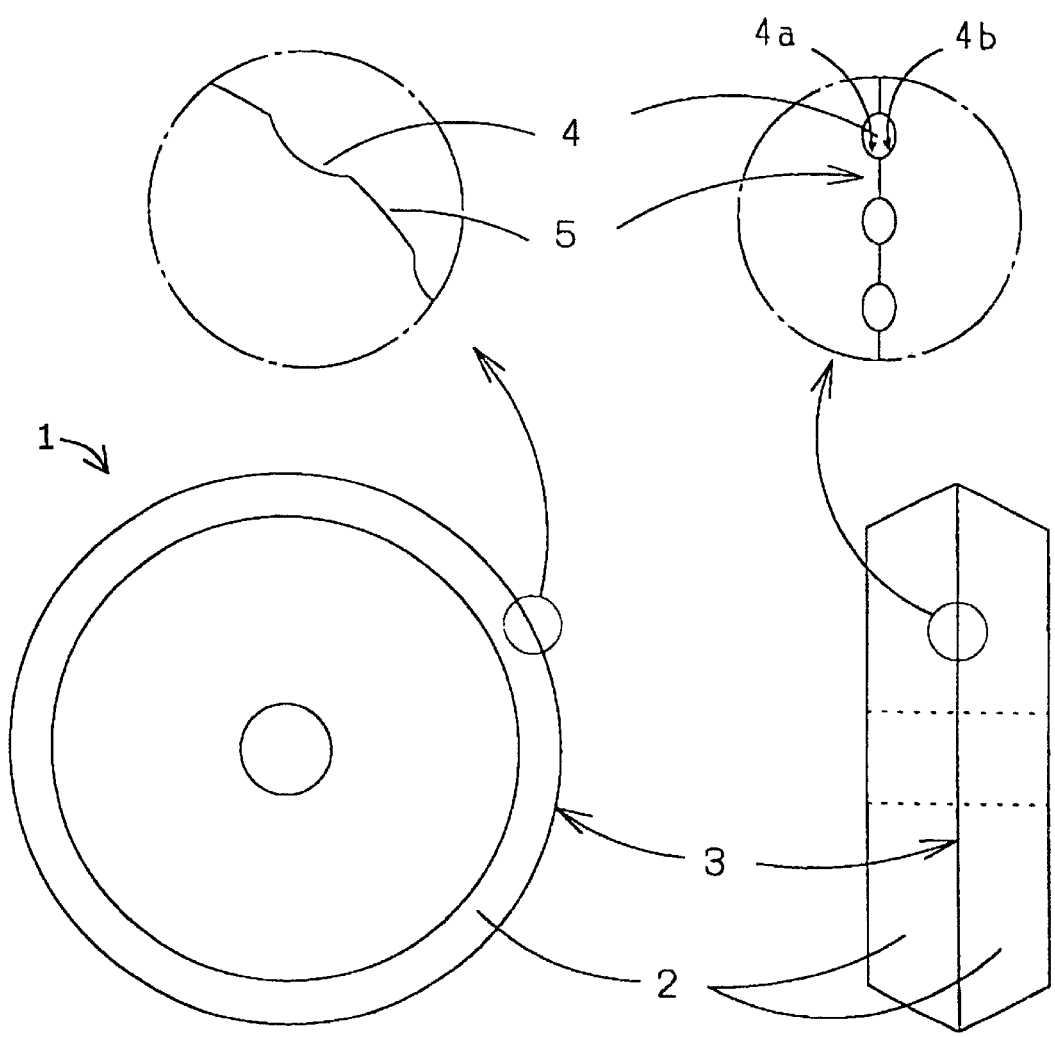
FIG. 1 is a diagram for explaining a prior art cutter wheel.

When the cutter wheel 11 (and 11') is used according to the scribing data, the depth of the vertical cracks produced is of the same order as that generated by the prior art cutter wheel 1 shown in FIG. 1, while the generation of horizontal cracks is further suppressed. When using the prior art cutter wheel shown in FIG. 1, it is understood that deep vertical cracks are generated due to impacts repeatedly generated as the protrusions 5 along the ridge strike the brittle plate at scribing. However, the protrusions 5 themselves are parts of a circumferential line which contacts the brittle plate, and it is further understood that portions 4a and 4b in FIG. 1 formed at the depressions 4 generate horizontal cracks. On the other hand, the generation of horizontal cracks is small for the cutter wheel 11 (and 11') of the first (and second) embodiment, and the reason is assumed as follows. The cutter wheel 11 (and 11') imparts an impact to the brittle plate at each vertex (peak) of the regular polygon along the ridge, but the vertex itself does not have any length along the direction of the ridge. Further, because the ridge except the vertices consists of straight lines or sides of the regular polygon, the crack depth into the brittle plate caused by the linear portions becomes smaller. Thus, the generation of horizontal cracks is suppressed.

Figure 4:
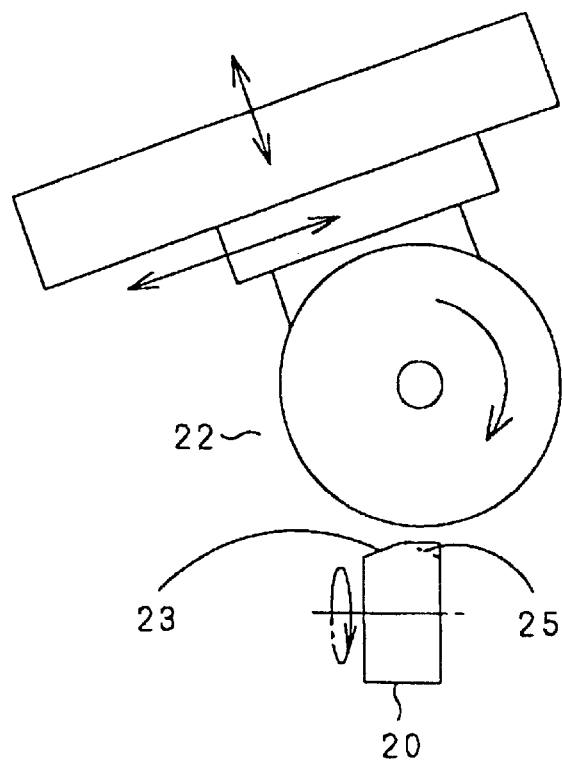
FIG. 4 is a schematic front view of a machine for fabricating cutter wheels.

FIG. 4 shows a machine for fabricating the cutter wheel 11. A disk-like wheel 20 made of a cemented carbide alloy has a shaft (not shown) and the shaft can rotate. When a bevel plane is formed on the left side of the V-shaped ridge, the wheel 20 is fixed, and a grinder 22 is moved in a direction along the bevel plane to form a plane 23 including a side (subsection) of the regular polygon having sixty vertices, and the plane 23 is ground. This is repeated each time the wheel 20 is rotated by 6° (=360/60), so that sixty planes are formed on the left side of the V-character-like ridge Thereafter, in order to form the other bevel planes on the right side, the wheel 20 is removed and reversed. Then, the wheel 20 is set to rotate again, and the position of the wheel 20 is determined according to working conditions by using an image processing system (not shown). Then, the grinder 22 is moved again similarly to form a plane 25 (represented by a dotted line) including a side of the regular polygon on the right side of the V-shaped ridge. This is repeated each time the wheel 20 is rotated by 6°. Thus, a cutter wheel 11 is obtained which has a ridge with the shape of a polygon having sixty vertices.

It is also possible to produce the cutter wheel 11 by using a prior art cutter wheel provided with a circular V-shaped ridge at an outer periphery. The prior art wheel is worked by the machine shown in FIG. 4 to grind the bevel portions including the ridge portion as explained above. It is similarly possible to produce the cutter wheel 11' by using a prior art cutter wheel having a circular V-shaped ridge at an outer periphery. The prior art cutter wheel is similarly worked by a machine disclosed in U.S. Pat. No. 5,836,229 to grind only the ridge portion.

Alternatively, electro-discharge machining may be used to fabricate the cutter wheel 11, 11' instead of grinding carried out by the above-mentioned machine.

In the first and second embodiments (FIGS. 2 and 3) as explained above, the ridge has the shape of a polygon when observed from a side of the cutter wheel. Therefore, an impact is given at each vertex of the polygon to a brittle plate thereby generating deep vertical cracks, while generation of unnecessary horizontal cracks is suppressed except by the vertices. As a result, the generation of horizontal cracks can be decreased while vertical cracks are deeply generated inside the brittle materials.

Figure 5A:
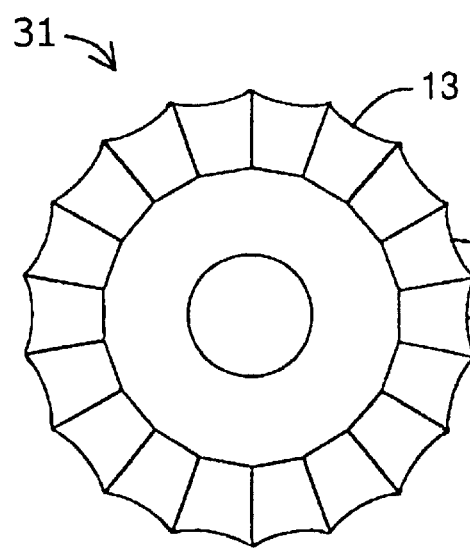
FIG. 5 is a diagram of a cutter wheel of a third embodiment of the invention.
Figure 5B:
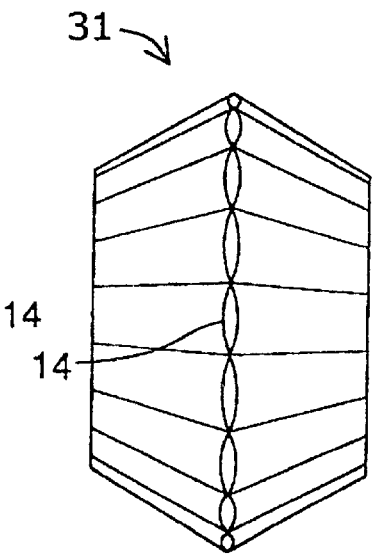

FIG. 5 shows a cutter wheel 31 of a third embodiment of the invention. FIG. 5A is a side view of the cutter wheel 31 and FIG. 5B is a front view of the same. A depression 14 is formed along the ridge for each side of the regular polygon with 60 vertices, similar to the depressions 4 of the prior art wheel shown in FIG. 1. The depressions 14 are formed to have a depth below a line or a side connecting two adjacent vertices of the regular polygon. For example, the depth of the depression 14 is about 0–20% of the length of the side of the regular polygon. Thus, the cutter wheel 31 does not have linear portions along the ridge. The depressions 14 may be formed by using a thin disk-like grinder moved in a direction perpendicular to the disk, as disclosed in the U.S. Pat. No. 5,836,229.

Figure 6A:
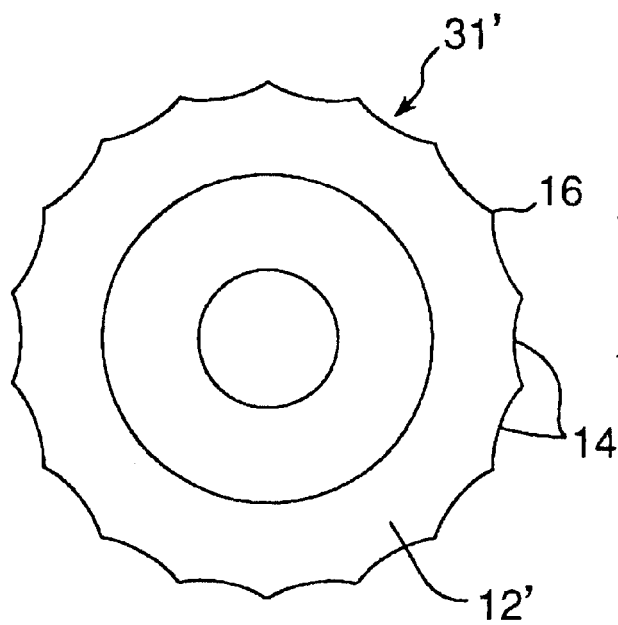
FIG. 6 is a diagram of a cutter wheel of a fourth embodiment of the invention.
Figure 6B:
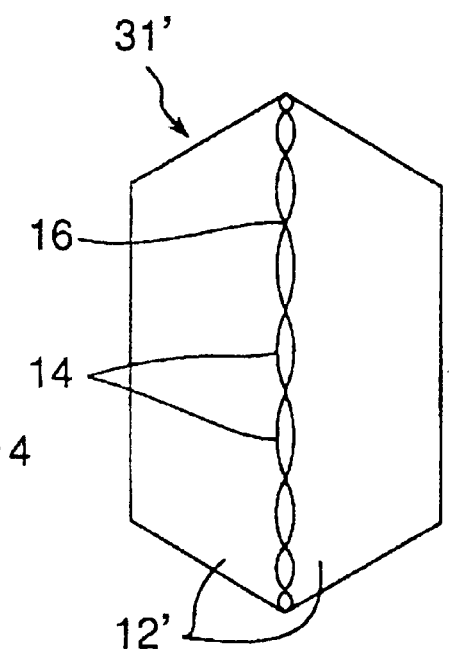

FIG. 6 shows a cutter wheel 31' of a fourth embodiment of the invention. FIG. 6A is a side view of the cutter wheel 31' and FIG. 6B is a front view of the same. The cutter wheel 31' is provided with sixty vertices (edges) at the ridge (a polygon shape with eighteen vertices is shown in FIG. 6A for simplicity).

The cutter wheel 31' is obtained by forming the ridge of the cutter wheel 11' in FIG. 3 to have sixty flat planes 15 and vertices 16 along the ridge, and round bevel planes 12'. The cutter wheel 31' is obtained after forming depressions 14 between the vertices 16 along the ridge (i.e., where the planes 15 were previously located). The depressions 14 are formed to have a depth below a line or a side connecting two adjacent vertices of the regular polygon. For example, the depth of the depression 14 is about 0–20% of the length of the side of the regular polygon. Thus, the cutter wheel 31' does not have linear portions along the ridge. The depressions 14 may be formed by using a thin disk-like grinder moved in a direction perpendicular to the disk, as disclosed in the U.S. Pat. No. 5,836,229.

In the above-mentioned ridge of the cutter wheel 11 or 11' shown in FIG. 2 or 3, the linear portions are provided except the vertices of the polygon, and the generation of the horizontal cracks on the brittle plate is decreased. On the other hand, in the cutter wheel 31 or 31' shown in FIG. 5 or 6, the depressions 14 are deeper than the linear portions in the cutter wheel 11 or 11'. Thus, the cutter wheel 31 in FIG. 5 (or 31' in FIG. 6) is not in close contact with the surface to be cut at portions of the wheel located between the vertices. As a result, the generation of the horizontal cracks is suppressed more than the case of the cutter wheel with the linear lines 13 in FIG. 2 (or the flat planes 15 in FIG. 3).

The above-mentioned dimensions of the cutter wheels 11, 11', 31, 31' are only examples. Recommended dimensions of a general cutter wheel are given below.

| | |
|---|---|
| Wheel diameter: | 1–20 mm. |
| Wheel thickness: | 0.6–5 mm. |
| Edge angle ($\theta$): | 90–160° |
| Number of vertices of polygon: | 16–300. |

General scribing conditions are as follows.

| | |
|---|---|
| Edge load: | 0.8–60 Kgf. |
| Scribing speed: | 50–1,000 mm/sec. |

In the third or fourth embodiment, depressions are formed between the vertices, as explained above. Therefore, necessary vertical cracks can be obtained by a smaller scribing load impressed at the ridge, while the generation of horizontal cracks can be decreased more than with the cutter wheel of the first or second embodiment.

The cutter wheel explained above is suitable for an automatic scriber and a manual cutter for brittle materials.

Figure 7:
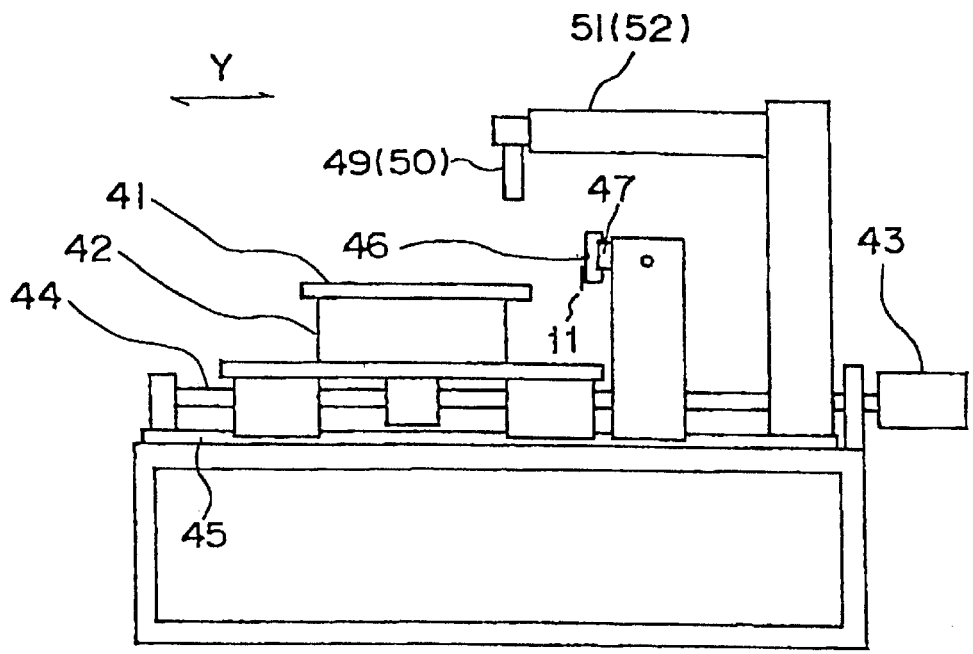
FIG. 7 is a schematic front view of an automatic scriber for brittle materials having a general mechanism.
Figure 8:
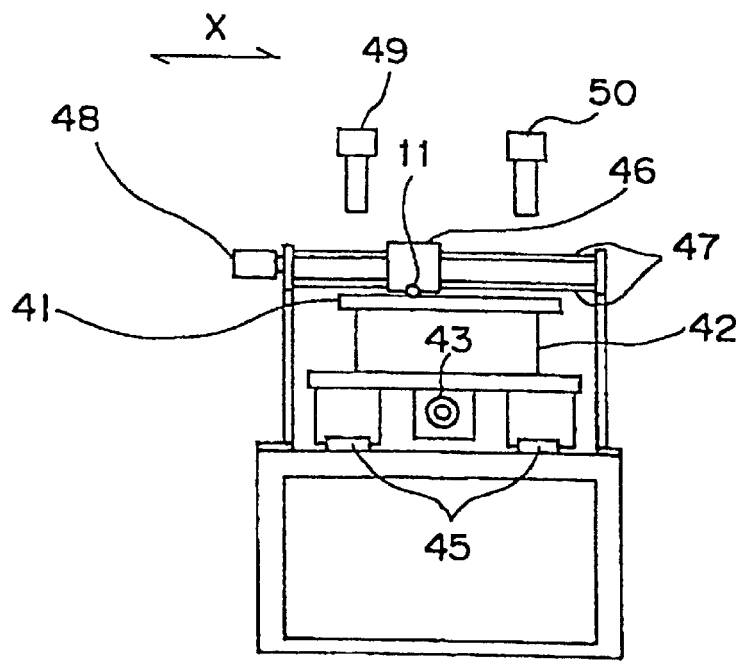
FIG. 8 is a side view of the automatic scriber.

FIGS. 7 and 8 are a front view and a side view of a general automatic scriber for brittle materials. A table 41 for supporting a brittle plate is rotated by a rotation table 42 in a horizontal plane, and it is moved along a rail 45 in a Y-direction (or left-to-right direction in FIG. 7) by a ball screw 44. On the other hand, a cutter head 46 is moved in an X-direction (or left-to-right direction in FIG. 8) along rails 47. The cutter head 46 has the cutter wheel 11, 11', 31, or 31' with a shaft fitted at the center thereof, and the shaft is rotatably supported at a lower end of the cutter head 46.

During scribing, each time the table 41 is moved in the Y-direction by a predetermined pitch the cutter head 46 is moved in the X-direction. Thus, the brittle plate is scribed in the X-direction. Then, after the table 41 is rotated by 90°, scribing is similarly performed. Accordingly, the brittle plate is also scribed in the Y-direction.

The automatic scriber for brittle materials explained above is one example of a scriber. The cutter wheel of the invention can also be used in other types of scribers. For example, the cutter head 46 can be fixed, and the table can be moved in X- and Y-directions. Alternatively, the table 41 can be fixed, and the cutter head 46 can be moved in X- and Y-directions.

Figure 9:
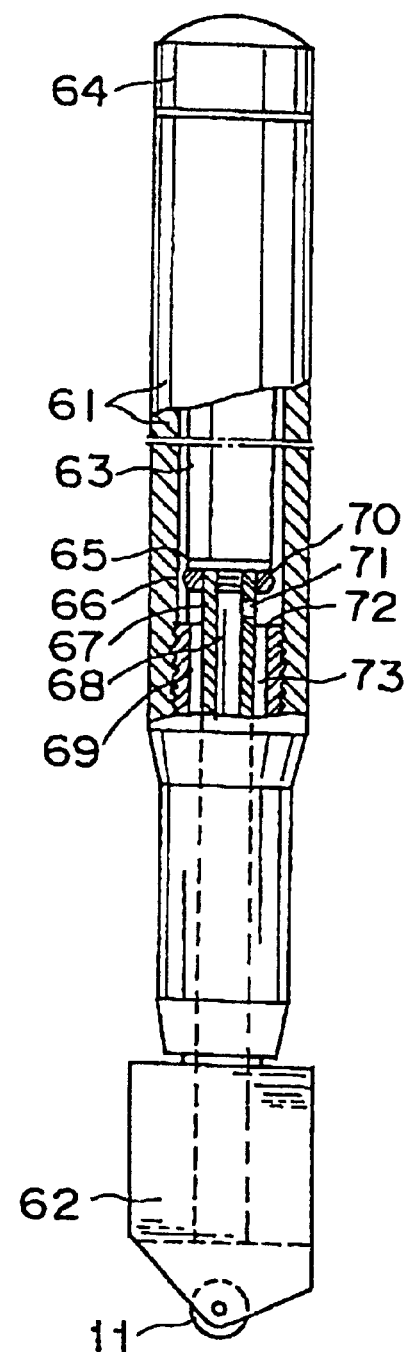
FIG. 9 is a partially broken front view of a manual cutter for brittle materials.

FIG. 9 shows the cutter wheel 11, 11', 31, or 31' mounted in a manual glass cutter disclosed in Japanese Utility Model Publication 62-23,780/1987. The glass cutter has a cylindrical handle 61 for grip and a head 62 provided at a lower side thereof. The glass cutter wheel 11, 11', 31, or 31' with a shaft is rotatably mounted to the head around the shaft. Further, an oil chamber 63, a cap 64 thereof, and components of a relevant mechanism 65–73 are provided in order to supply oil to the glass cutter wheel 11, 11', 31, or 31', but a detailed explanation thereof is omitted here.

Figure 10:
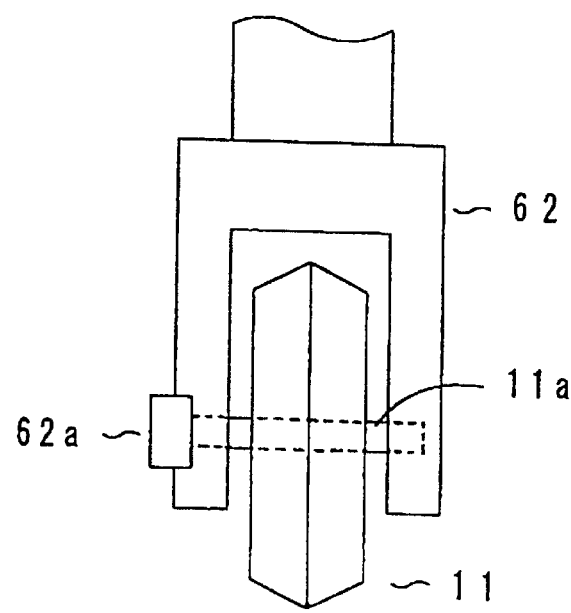
FIG. 10 is a schematic front view of a device using a cutter wheel.

FIG. 10 shows the head 62 shown in FIG. 9. A shaft 11$a$ is inserted through the hole of the glass cutter wheel 11, 11', 31, or 31', and two ends of the shaft 11$a$ are supported at a two-fork type member of the head 62. A cap 62$a$ stops the shaft 11$a$.

Figure 11A:
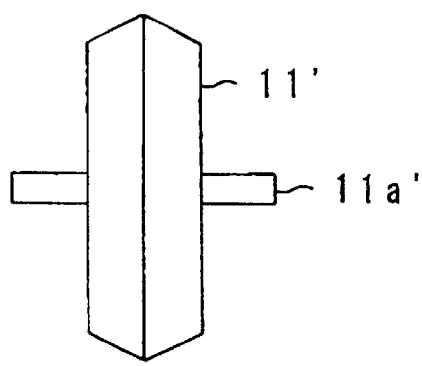
FIGS. 11A and 11B are schematic front views of other cutter wheels with shafts.
Figure 11B:
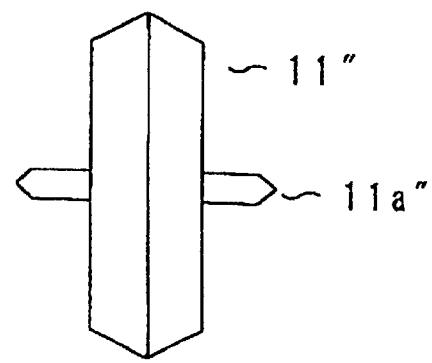

The cutter wheel 11, 11', 31, or 31' is provided as an element as shown in FIGS. 2, 3, 5 and 6. When it is used, a shaft 11$a$ shown in FIG. 10 is inserted into the center hole provided in the wheel 11, 11', 31, or 31'. However, because the outer diameter of the wheel is very small, the diameter of the shaft 11$a$ may become equal to or smaller than 1 mm, and it is difficult to handle the shaft. Therefore, as shown in FIG. 11A, a shaft 11$a$' may be integrated with the main body of the cutter wheel to form a single unit 11'. Alternatively, as shown in FIG. 11B, a pivot shaft 11$a$" may be integrated with the main body of the cutter wheel to form a single unit 11". The shape of the shaft depends on the structure of the bearing at the cutter head 62.

In the above-mentioned embodiments of the invention, a cutter wheel has a shape of a regular polygon. However, a cutter wheel having a polygon shape has a similar advantage.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A cutter wheel for cutting a brittle material, comprising:
 a flat plate having:
  a first side;
  a second side parallel to said first side, whereby an axis of rotation of said flat plate is perpendicular to said first side and said second side; and
  a peripheral portion having:
   a first bevel portion intersecting said first side of said flat plate;

a second bevel portion intersecting said second side of said flat plate; and a ridge between said first bevel portion and said second bevel portion, said ridge including a plurality of subsections and a plurality of vertices, each of said vertices, being located at a point between a pair of adjacent subsections of said ridge such that a periphery of said ridge including said vertices has a convex polygonal shape, said point being shared by said each of said vertices, said pair of adjacent subsections of said ridge, said first bevel portion, and said second bevel portion, said first bevel portion intersecting said second bevel portion at said vertices of said ridge to form an obtuse angle, and said ridge being parallel to said first side and said second side.

2. The cutter wheel of claim 1, wherein each of said first bevel portion and said second bevel portion has a frusto-conical shape, and said first bevel portion and said second bevel portion are symmetrical with respect to the axis of rotation.

3. The cutter wheel of claim 2, wherein each of said subsections of said ridge comprises a flat portion between two adjacent vertices.

4. The cutter wheel of claim 2, wherein each of said subsections of said ridge comprises a curved concave portion between two adjacent vertices.

5. The cutter wheel of claim 4, wherein a depth of said curved concave portion relative to a straight line connecting said two adjacent vertices at any location along said curved concave portion is in a range of 0% to 20% of a length of the straight line.

6. The cutter wheel of claim 1, wherein each of said first bevel portion and said second bevel portion includes a plurality of flat planar sections, each of said flat planar sections of said first bevel portion being located between one of said subsections of said ridge and said first side, each of said flat planar sections of said second bevel portion being located between one of said subsections of said ridge and said second side, each pair of adjacent flat planar sections of each of said first bevel portion and said second bevel portion sharing a common borderline having an end at one of said vertices of said ridge.

7. The cutter wheel of claim 6, wherein each of said subsections of said ridge comprises a straight edge formed by an intersection of a flat planar section of said first bevel portion and a flat planar section of said second bevel portion, said straight edge connecting two adjacent vertices of said ridge.

8. The cutter wheel of claim 6, wherein each of said subsections of said ridge comprises a curved concave portion between two adjacent vertices.

9. The cutter wheel of claim 8, wherein a depth of said curved concave portion relative to a straight line connecting said two adjacent vertices at any location along said curved concave portion is in a range of 0% to 20% of a length of the straight line.

10. The cutter wheel of claim 1, wherein said vertices of said ridge are equally spaced apart.

11. The cutter wheel of claim 1, wherein a circumference of said cutter wheel through said vertices of said ridge has a diameter in a range of 1 mm to 20 mm.

12. The cutter wheel of claim 1, wherein said flat plate has a thickness between said first side and said second side in a range of 0.6 mm to 5.0 mm.

13. The cutter wheel of claim 1, wherein a quantity of vertices of said ridge is in a range of 16 to 300.

14. The cutter wheel of claim 1, wherein said flat plate has a through-hole formed along the axis of rotation of said flat plate.

15. The cutter wheel of claim 14, further comprising a shaft fitted in said through-hole.

16. The cutter wheel of claim 1, further comprising a shaft integrated with said flat plate at the axis of rotation of said flat plate such that said shaft and said flat plate have a one-piece construction.

17. The cutter wheel of claim 1, wherein said first bevel portion intersects said second bevel portion at said vertices of said ridge to form an angle of 125 degrees.

18. A scriber for scribing brittle materials, comprising:

a table for supporting a brittle plate;

a cutter head including a cutter wheel for cutting the brittle plate, said cutter wheel comprising a flat plate having:

a first side;

a second side parallel to said first side, whereby an axis of rotation of said flat plate is perpendicular to said first side and said second side; and a peripheral portion having:
a first bevel portion intersecting said first side of said flat plate;
a second bevel portion intersecting said second side of said flat plate; and
a ridge between said first bevel portion and said second bevel portion, said ridge including a plurality of subsections and a plurality of vertices, each of said vertices being located at a point between a pair of adjacent subsections of said ridge such that a periphery of said ridge including said vertices has a convex polygonal shape, said point being shared by said each of said vertices, said pair of adjacent subsections of said ridge, said first bevel portion, and said second bevel portion, said first bevel portion intersecting said second bevel portion at said vertices of said ridge to form an obtuse angle, and said ridge being parallel to said first side and said second side; and a controller for controlling a movement of said cutter head relative to said table.

19. A scriber for scribing brittle materials, comprising:

a grip having a holder at an end thereof; and a cutter wheel rotatably supported by said grip, said cutter wheel comprising a flat plate having:

a first side;

a second side parallel to said first side, whereby an axis of rotation of said flat plate is perpendicular to said first side and said second side; and a peripheral portion having:
a first bevel portion intersecting said first side of said flat plate;
a second bevel portion intersecting said second side of said flat plate; and
a ridge between said first bevel portion and said second bevel portion, said ridge including a plurality of subsections and a plurality of vertices, each of said vertices being located at a point between a pair of adjacent subsections of said ridge such that a periphery of said ridge including said vertices has a convex polygonal shape, said point being shared by said each of said vertices, said pair of adjacent subsections of said ridge, said first bevel portion, and said second bevel portion, said first bevel portion intersecting said second bevel portion at said vertices of said ridge to form an obtuse angle, and said ridge being parallel to said first side and said second side.

20. The cutter wheel of claim 1, wherein said first bevel portion comprises a plurality of adjacent first bevel sub-portions aligned along said ridge, and said second bevel portion comprises a plurality of adjacent second bevel sub-portions aligned along said ridge, each of said first bevel sub-portions and each of said second bevel sub-portions being flat, each of said first bevel sub-portions sharing said point of a respective one of each of said vertices with one of said second bevel sub-portions.

21. The cutter wheel of claim 18, wherein said first bevel portion comprises a plurality of adjacent first bevel sub-portions aligned along said ridge, and said second bevel portion comprises a plurality of adjacent second bevel sub-portions aligned along said ridge, each of said first bevel sub-portions and each of said second bevel sub-portions being flat, each of said first bevel sub-portions sharing said point of a respective one of each of said vertices with one of said second bevel sub-portions.

22. The cutter wheel of claim 19, wherein said first bevel portion comprises a plurality of adjacent first bevel sub-portions aligned along said ridge, and said second bevel portion comprises a plurality of adjacent second bevel sub-portions aligned along said ridge, each of said first bevel sub-portions and each of said second bevel sub-portions being flat, each of said first bevel subportions sharing said point of a respective one of each of said vertices with one of said second bevel sub-portions.

* * * * *